J. R. ROGERS.
Broadcast-Seeder.
No. 27,385.
Patented Mar. 6, 1860.
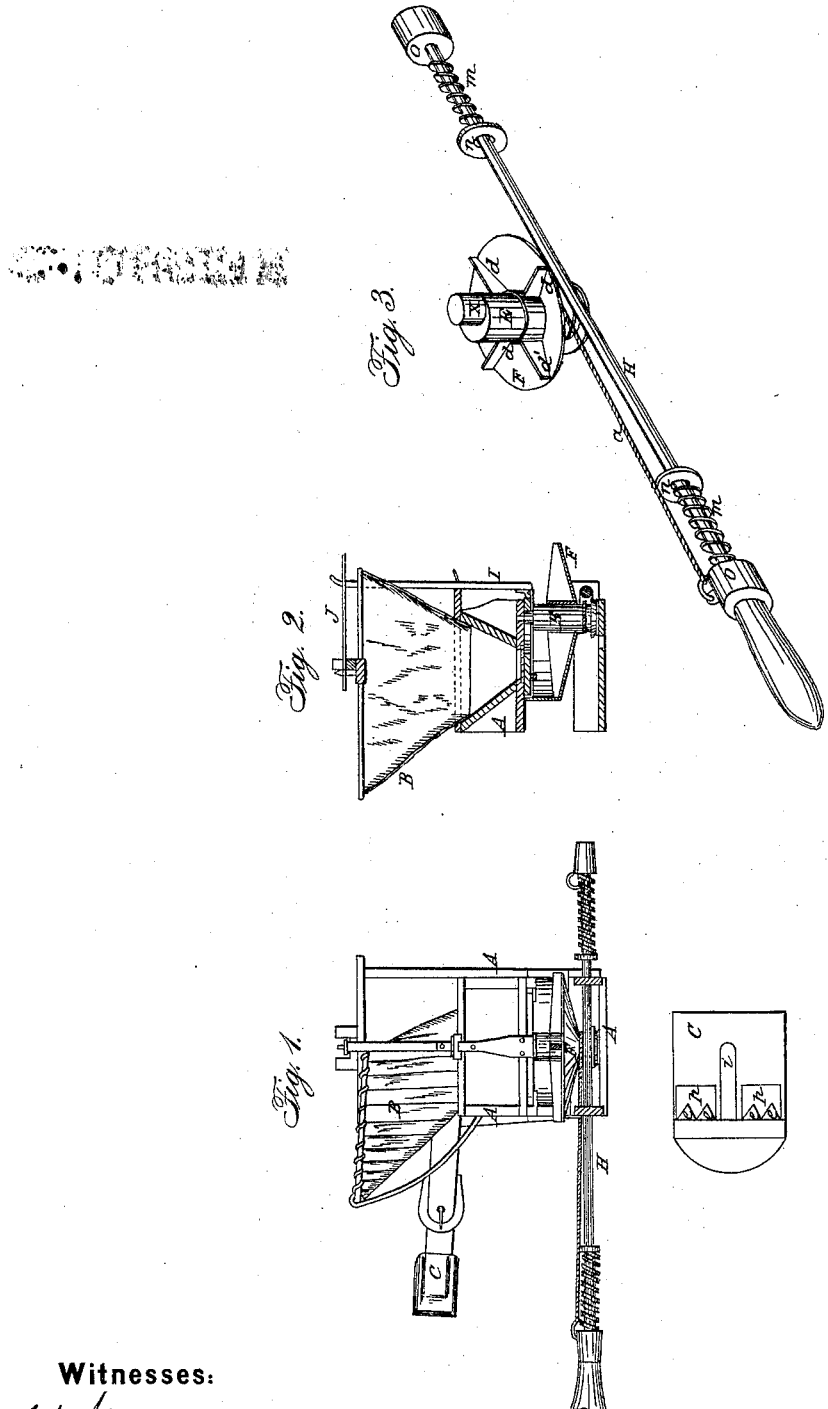
Witnesses:
Inventor:

UNITED STATES PATENT OFFICE.

JOHN R. ROGERS, OF SACRAMENTO, WISCONSIN.

IMPROVEMENT IN CENTRIFUGAL SEEDING-MACHINES.

Specification forming part of Letters Patent No. 27,385, dated March 6, 1860.

*To all whom it may concern:*

Be it known that I, JNO. R. ROGERS, of Sacramento, in the county of Green Lake and State of Wisconsin, have invented certain new and useful Improvements in Centrifugal Seeders; and I do hereby declare that the following is a full, clear, and exact description of the same, reference being had to the accompanying drawings, and to the letters of reference marked thereon.

The nature of my invention consists in the employment and arrangement of the several parts described, substantially in the manner hereinafter set forth.

In the drawings, Figure 1 represents a side elevation. Fig. 2 represents a section of seed-hopper. Fig. 3 is a detached view of the rod and cord for operating the seeding-wheel. Fig. 4 is a plan view of seed-slide and agitator.

In the figures, A represents the frame of the machine, which may be made in any suitable form, so that it is not made too heavy, as the machine is intended for hand use, and is carried by the operator.

B represents a flexible hopper, made of cloth or leather or other suitable material. The hopper B is secured at its lower end to the frame, while a wire rod passes around it at its upper extremity to hold it in proper shape.

C represents a band or strap by means of which the machine is secured to the body of the operator.

E represents a vertical shaft, which is secured in the lower portion of the frame. This shaft passes through and is secured to a wheel, F. The wheel F is made dish-shaped, being deepest at its center, or immediately around the shaft E, which passes through its center. The wheel F is provided with a series of flanges, $d\ d$, which radiate from its center, terminating at its periphery.

H represents a rod provided with a handle, with a cord, $a$, and surrounded near each end with two coiled wire springs, $m\ m$. The springs $m\ m$ rest at one end against shoulders $o\ o$ on the rod H and at their other end against slide-washers $n\ n$. The rod H slides in guides in the lower portion of the frame, and the cord $a$ winds once around the shaft E, the ends of said cord being secured near each end of the rod H. It will be seen now that when the rod is moved backward and forward by means of the hand of the operator the shaft E, and consequently the wheel F, will have a backward and forward rotary motion. The shaft E being made small where the cord passes around it, the wheel F necessarily has a quick rotation as the rod is moved briskly, and consequently the centrifugal action is great enough to throw the seed which fall upon it some distance.

$c$ represents a seed-slide and shaker, which is formed in the manner shown in Fig. 4. It is pivoted with a slot, $i$, through which the eccentric portion of the shaft E (marked $x$) passes, by means of which it is given a lateral vibration to agitate the seed with its teeth $e\ e$.

$p\ p$ represent the apertures through which the seed pass to the wheel F. A lever, I, connects to the outer end of this slide $c$, and a rod, J, connects with said lever for the purpose of moving the slide $c$, so as to open or close the seed-aperture.

In using this machine the seed is placed in the hopper and the machine is secured to the operator by means of the strap C. The operator moves the slide $c$ by lever I and rod J, so as to allow a sufficient quantity of grain to fall through upon wheel F, and, walking forward, gives the rod H a backward-and-forward motion at each step. The grain, falling upon the wheel F, is thrown off violently and distributed over the ground. The springs $m\ m$ serve to brake and give an easy motion to the rod H. The seed may thus be distributed regularly and with great rapidity.

Having thus fully described my invention, what I claim as new, and desire to secure by Letters Patent, is—

1. The arrangement of the rod H and the cord $a$, in connection with the shaft E and wheel F, the same being used in the manner and for the purpose specified.

2. The arrangement of the shaft E with the slotted seed slide C, shaker $c$, lever I, and rod J, in the manner and for the purpose herein set forth.

JOHN R. ROGERS.

Witnesses:
O. F. SILVER,
J. V. SWETTING.